(12) United States Patent
Bhogal et al.

(10) Patent No.: US 8,217,854 B2
(45) Date of Patent: Jul. 10, 2012

(54) METHOD AND SYSTEM FOR MANAGING A MULTI-FOCUS REMOTE CONTROL SESSION

(75) Inventors: Kulvir Singh Bhogal, Fort Worth, TX (US); Gregory Jensen Boss, American Fork, UT (US); Rick Allen Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/865,123

(22) Filed: Oct. 1, 2007

(65) Prior Publication Data

US 2009/0085871 A1 Apr. 2, 2009

(51) Int. Cl.
G09G 5/00 (2006.01)
(52) U.S. Cl. ........... 345/1.1; 345/1.2; 345/2.1; 709/204; 715/740; 715/741; 715/743; 715/751; 715/752
(58) Field of Classification Search .................. 345/156, 345/157, 1.1, 2.1–2.3; 715/740, 750–759, 715/790, 794, 797, 802–804, 812, 831, 741–743; 709/204
See application file for complete search history.

(56) References Cited

U.S. PATENT DOCUMENTS

| | | | |
|---|---|---|---|
| 5,408,600 A | 4/1995 | Garfinkel et al. | |
| 5,796,396 A | 8/1998 | Rich | |
| 7,242,389 B1 * | 7/2007 | Stern | 345/158 |
| 7,712,041 B2 * | 5/2010 | Toyama et al. | 715/778 |
| 2003/0140101 A1 | 7/2003 | Kunugi et al. | |
| 2003/0217171 A1 | 11/2003 | Von Stuermer et al. | |
| 2004/0174830 A1 * | 9/2004 | Koskelainen et al. | 370/260 |
| 2004/0230876 A1 | 11/2004 | Moribe | |
| 2005/0132045 A1 | 6/2005 | Hornback, Jr. et al. | |
| 2005/0134911 A1 | 6/2005 | Komatsu et al. | |
| 2005/0190769 A1 | 9/2005 | Smith | |
| 2006/0179411 A1 * | 8/2006 | Wolf et al. | 715/751 |
| 2007/0226636 A1 * | 9/2007 | Carpenter et al. | 715/751 |

* cited by examiner

Primary Examiner — Quan-Zhen Wang
Assistant Examiner — Jennifer Nguyen
(74) Attorney, Agent, or Firm — Schmeiser, Olsen & Watts; William E. Schiesser

(57) ABSTRACT

A method and system for managing a multi-focus remote control session (RCS) within a computer system. A unique identifier (UserID) of each user and associated input devices are registered to the RCS. The users have shared concurrent control of a computer screen via the input devices. Responsive to selection of windows within the computer screen by the input devices, concurrently operative focus is provided to each selected window and is specific to the UserID associated with the input device that selected the window. Each selected window having focus may be accessed and manipulated by only the input devices associated with the UserID to which the focus provided to each selected window is specific. The selected windows to which focus has been provided are recording in a computer readable medium in association with the UserID specific to the selection of the windows.

20 Claims, 12 Drawing Sheets

METHOD AND SYSTEM FOR MANAGING A MULTI-FOCUS REMOTE CONTROL SESSION

RELATED APPLICATION

This application is related to U.S. patent application Ser. No. 11/690,490, filed Mar. 23, 2007 and entitled "Method and System For Managing a Remote Control Session".

FIELD OF THE INVENTION

A method and system for managing a multi-focus remote control session.

BACKGROUND OF THE INVENTION

Remote control software has historically been used by people with computer administrative functions and also those with deep technical backgrounds. However, increasingly, remote control software is being used by "average" computer users, especially when those users have routine access to more than one computer, or travel away from the office and still need access to the machines that may reside there. Furthermore, aiding the proliferation of these programs, help desks and major computer manufacturers are now including remote control software as a default installed program to assist with problem determination and solutions. This type of software can be extremely beneficial for fixing problems quickly and accurately, accessing remote files and programs otherwise not available, and helping to train geographically disparate users.

Remote control software may allow two or more users to share a screen. When two or more users are sharing control of a screen, however, significant confusion is often generated due to the conflicting actions of the users' input devices. Consider two users denoted as a Local User and a Remote User. When the Remote User moves the mouse of the Local User's screen at the same time the Local User is moving the mouse, both users will see very odd and unexpected behavior. For example, the Remote User may click on a first window and begin dragging the first window to a new location, while the Local User is moving the mouse to another area of the screen to activate a second program. The movements of both users are registered with the computer and the first window will jump sporadically back and forth between the two conflicting mouse movements. At other times, it is common for one user to be typing in a word processor, or programming development environment while the Remote User needs to simply move the mouse away from the remote control screen into another window that is local to the Remote User, but the Remote User has no way of transferring the Remote User's own local mouse outside of the remote control window without registering that movement with the Local User's computer. The simple act of moving the mouse will almost always result in a focus change of windows in the remote control session and thus interrupt the Local User's input in the previous window which had focus. The effects can sometimes be more than inconvenient when such a movement or change in focus launches an unintended program, deletes a file, or makes some other unexpected change.

A current implementation of remote control software disables all screen access except for access by one user. This implementation has the disadvantage that once a first user grants control to a second user, the first user cannot regain control until the second user gives up control voluntarily.

There are no known solutions to these problems. Remote control and session-sharing software packages generally exhibit this problematic behavior and condition. Unfortunately, both users must endure the situation, or one user needs to be patient and physically watch the screen, determine or guess when the other user is not using the mouse or talking any action, and then to tale control of the cursor.

Thus, there is a need for a remote control session method and system that alleviates at least one of the aforementioned problems.

SUMMARY OF THE INVENTION

The present invention provides a method for managing a multi-focus remote control session (RCS) within a computer system, said method comprising:

registering to the RCS a UserID of each user of a plurality of users and at least one input device associated with the UserID of each user, wherein each user of the plurality of users is coupled to the RCS via a communication network, wherein the UserID of each user is a unique identifier of each user within the RCS, wherein the at least one input device associated with the UserID of each user is attached to the computer system, and wherein said registering results in the plurality of users having shared concurrent control of a computer screen of the computer system via the at least one input device associated with the UserID of each user;

responsive to selection of a window within the computer screen by an input device of the at least one input device associated with the UserID of each user after each user has been registered to the RCS, providing focus to each selected window, wherein the focus provided to the selected widows are concurrently operative, wherein the focus provided to each window is specific to the UserID associated with the input device that selected the window, and wherein each selected window having focus is configured to be accessed and manipulated by only the at least one input device associated with the UserID to which the focus provided to each selected window is specific; and recording, in a computer readable medium of the computer system, the selected windows to which focus has been provided, wherein each selected window is recorded in association with the UserID to which the focus provided to each selected window is specific.

wherein said registering, said providing focus, and said recording the selected windows are performed by program code while executing on a processor of a computer system that is coupled to the communication network.

The present invention provides a method and system that overcomes at least one of the disadvantages in existing remote control software.

DETAILED DESCRIPTION OF THE INVENTION

The present invention provides a method and system for managing a remote control session (RCS or "session") in which control of the input devices (keyboard, mouse, light pen, touch pad, pointing stick, etc.) of a plurality of authorized users are concurrently employed in active usage by the authorized users.

The present invention involves inclusion of logic in program code such a remote control program or an operating system (OS) such that multiple users can control multiple input devices (keyboard, mouse, light pen, touch pad, pointing stick, etc) at the same time. In contrast, no current or prior art operating system or remote control program allows multiple users to control multiple mouse pointers and associated input devices at the same time. By facilitating implementation of software that allows two or more pointers to control and take action on multiple elements within a graphical user interface (GUI) having an associated computer screen, the present invention provides for a more effective remote control session than currently exists.

The present invention describes program code that will allow multiple windows to obtain focus simultaneously. A window is said to have focus if the window in a GUI environment is able to be acted upon and is denoted by a distinguishing factor from all windows not having focus. A distinguishing factor may be, inter alia, a highlighted Title Bar associated with a window having focus. The present invention permits multiple windows to obtain focus simultaneously, which means that multiple pointers may have control of the GUI and can take action upon elements within the GUI concurrently.

A window that has focus may be displayed on top of all other windows and brought to the foreground. The present invention also permits windows being overlapped by one or more other windows to also have focus. Multiple windows may have concurrent (i.e., simultaneous) focus. Each window having focus may receive input from different input devices regardless of whether or not each such window having focus is overlapped by another window having focus.

Each user of the system can login under each user's own UserID, wherein the UserID of each user is a unique identifier of each user within the RCS. Different users may have focus in different windows or in a same window in accordance with various embodiments of the present invention as will be described infra.

Figure 1:
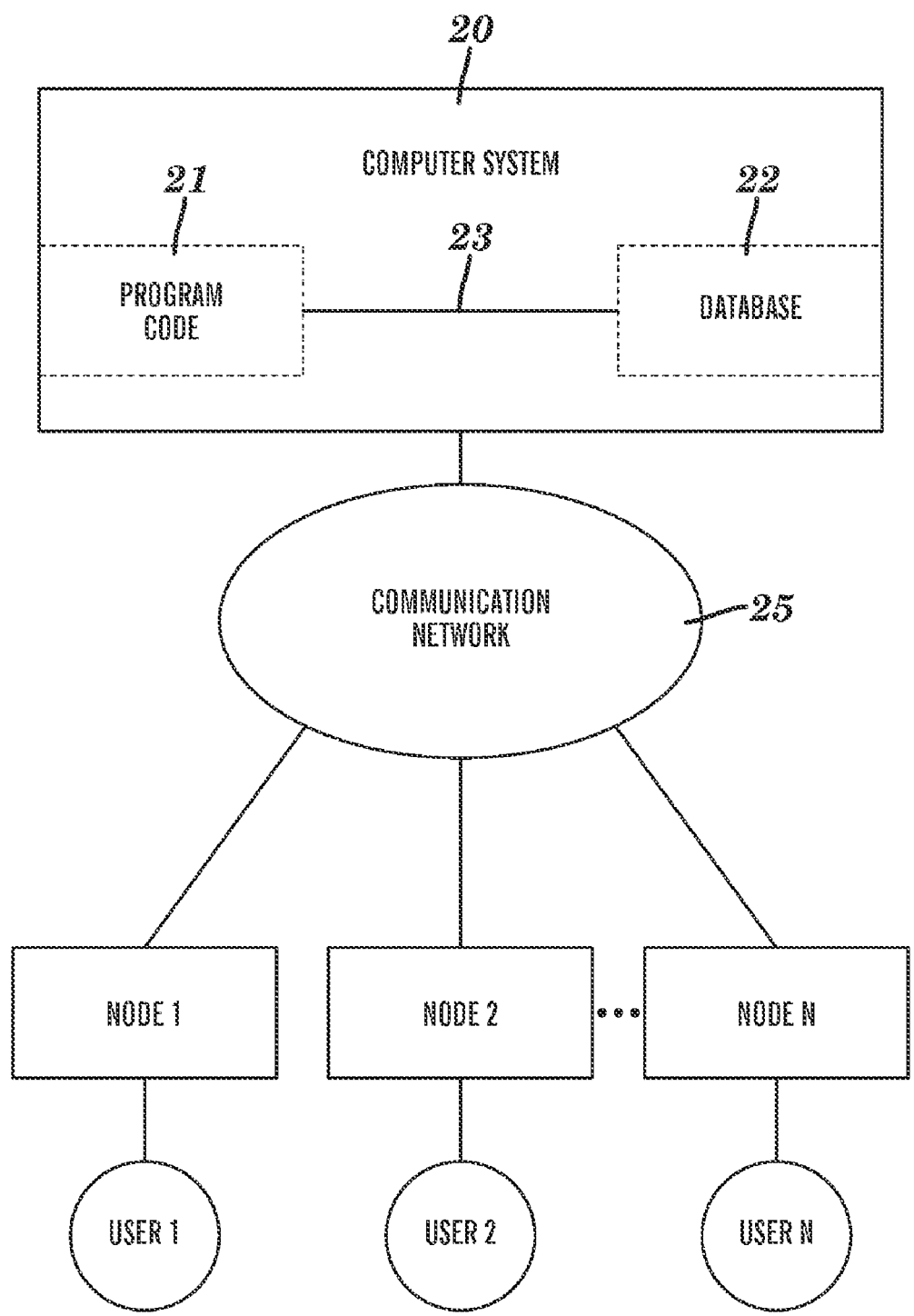
FIG. 1 depicts a communication network to which is coupled a computer system and N nodes (N at least 2), in accordance with embodiments of the present invention.

FIG. 1 depicts a communication network 25 to which is coupled a computer system 20 and N nodes denoted as node 1, node 2, ..., node N, in accordance with embodiments of the present invention. N is an integer of at least 2.

The communication network 25 may comprise a local area network (LAN), a wide area network (WAN), a public switched telephone network (PSTN), an intranet, the Internet, a cable network operating in the radio-frequency domain and/or the Internet Protocol (IP) domain, a wired network (e.g., using copper), telephone network, packet network, an optical network (e.g., using optical fiber), a wireless network, etc.

The computer system 20 (e.g., the computer system 90 of FIG. 5, described infra) comprises program code 21 and a database 22, wherein the program code 21 is coupled to the database 22 via connection 23. The program code 21 may be a remote control program or an operating system of the computer system 20. The program code 21 is configured to be executed on a processor of the computer system 20 to implement a method for managing a remote control session (RCS) in accordance with the present invention. Nodes 1, 2, ... N each represent a computer, computer system, workstation, etc. N users (denoted as user 1, user 2, ..., user N) are coupled to the N nodes, so as to have access to the N nodes, on a one-to-one basis; i.e., user I is coupled to node I for I=1, 2, ..., N. The N users are participants in the RCS and include at least two authorized users. Each user of the N users is identified by a unique identifier called a UserID. Thus, users 1, 2, ..., N may have unique identifiers UserID1, UserID2, ..., UserIDN, respectively.

The present invention provides for multi-focus, multiple pointers, management of pointer relationshops, and management of UserID mappings.

Figure 2:
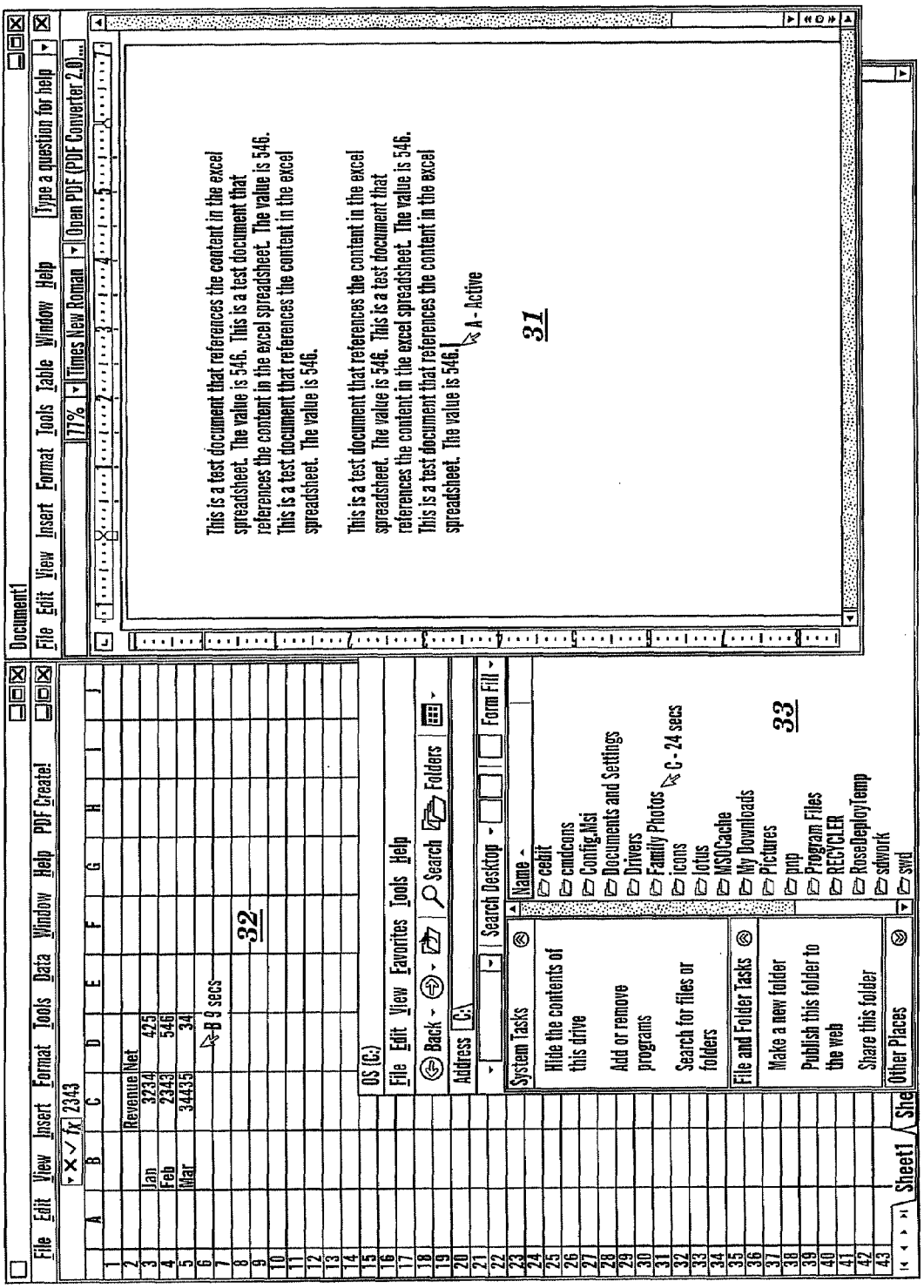
FIG. 2 depicts an illustrative shared computer screen 30 with multi-focus, in accordance with embodiments of the present invention.

FIG. 2 depicts an illustrative shared computer screen 30 with multi-focus, in accordance with embodiments of the present invention. During the RCS, the N users (N at least 2) have control of their input devices for concurrently manipulating the shared computer screen 30, wherein control of the input devices (keyboard, mouse, light pen, etc.) of the N users are concurrently employed in active usage by the N users.

The shared computer screen 30 has three windows in focus (i.e., open and able to be acted upon), namely windows 31, 32, and 33. Window 31 is displaying a document via a word processor, window 32 is displaying a spreadsheet, and window 33 is displaying a file explorer. The N users are each able to view the motion of all input devices of all N users, and of all content in each window of windows 31-33 throughout the RCS. In one embodiment, a first user of the N users has focus in window 31, a second user of the N users has focus in window 32, and a third user of the N users has focus in window 33.

Figure 3:
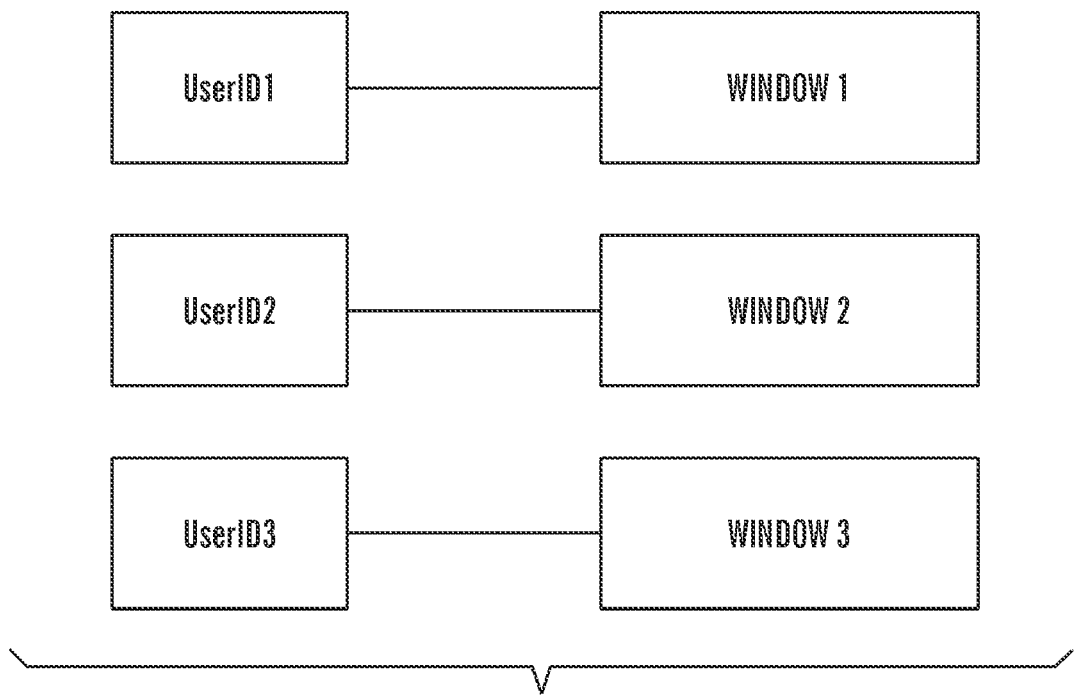
FIGS. 3-5 depict multiple users having multi-focus access to multiple windows concurrently in various embodiments of the present invention.
Figure 4:
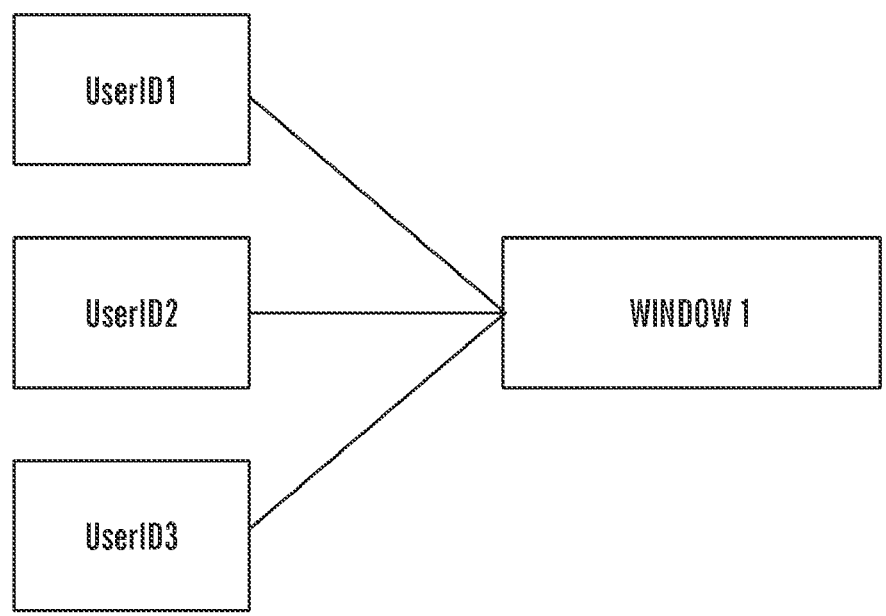
Figure 5:
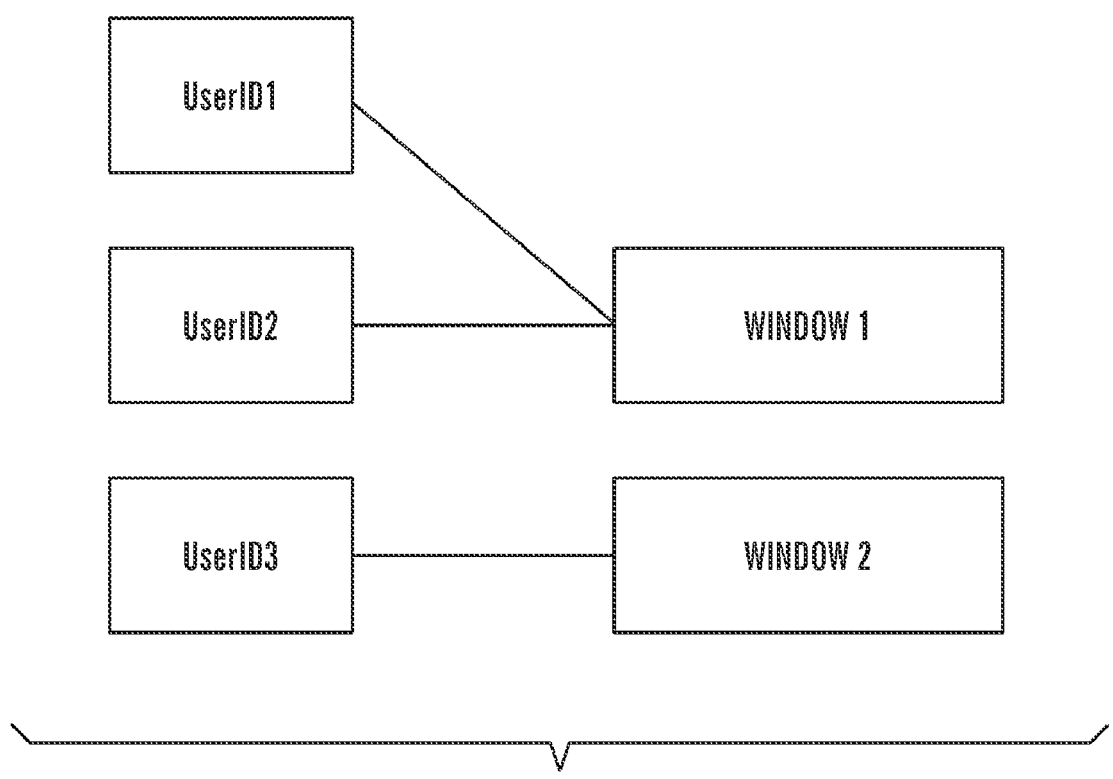

Generally, each user of the N users has concurrent access to a window that each user has selected with an input device. FIGS. 3-5 depict the N users having multi-focus access to multiple windows concurrently in various embodiments of the present invention.

In one embodiment illustrated in FIG. 3, N=3, wherein users 1, 2, and 3 are identified by unique identifiers denoted as UserID1, UserID2, and UserID3, respectively. Users 1, 2, and 3 have concurrent access to windows 1, 2, and 3, respectively.

In this embodiment, each user has concurrent access to a different window and no two users have concurrent access to a same window.

In one embodiment illustrated in FIG. 4, N=3, wherein users 1, 2, and 3 are identified by unique identifiers denoted as UserID1, UserID2, and UserID3, respectively. Users 1, 2, and 3 have concurrent access to window 1. In this embodiment, each user has concurrently access to a same window, namely window 1.

In one embodiment illustrated in FIG. 5, N=3, wherein users 1, 2, and 3 are identified by unique identifiers denoted as UserID1, UserID2, and UserID3, respectively. Users 1 and 2 have concurrent access to window 1. User 2 has access to window 2 which is concurrent with the access that users 1 and 2 have to window 1.

A user is said to have access to a window if the user can manipulate the user's input devices to navigate and perform operations on the window and within the window. Performing operations on the window may include opening the window, closing the window, moving the window within the shared computer screen 30, and resizing the window within the shared computer screen 30. Performing operations within the window may include operations on content within the window, such as, inter alia, manipulation of a word processor, spreadsheet, or an other program or application within the window.

Figure 6:
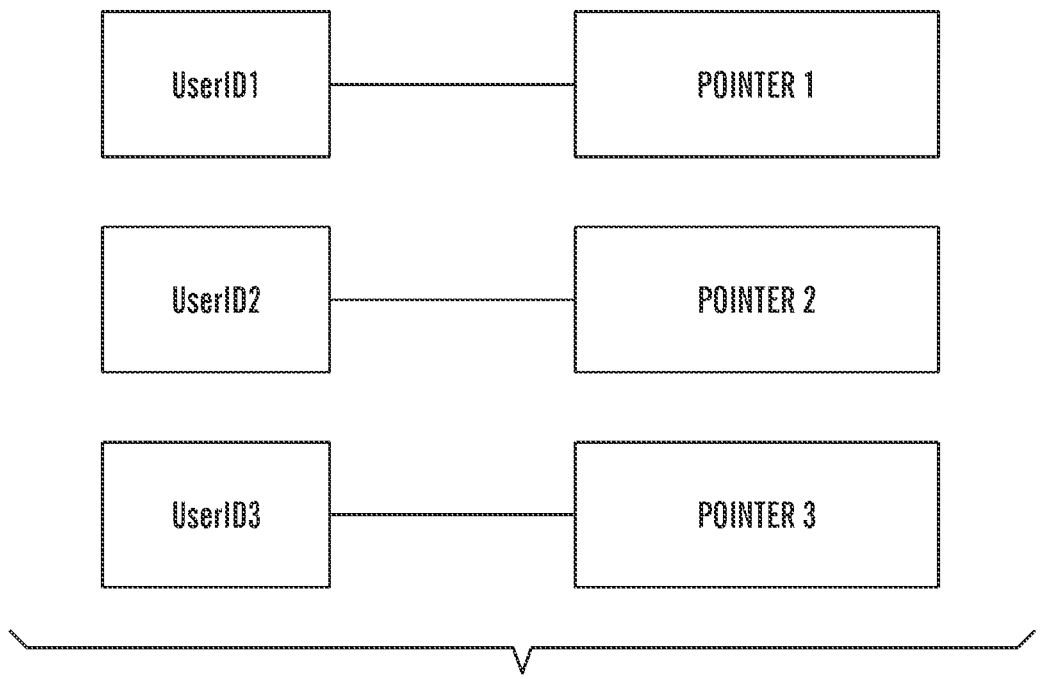
FIG. 6 describes the use of multiple pointers, in accordance with embodiments of the present invention.

FIG. 6 describes the use of multiple pointers, in accordance with embodiments of the present invention. The use of multiple pointers is characterized by each user having a connection to the same session, each user having a pointer device (e.g., a mouse) to control each respective user's pointer, and only the mouse of each user moves in response to each user moving his/her mouse. Each similar class input device, such as a mouse, is assigned its own visual mouse pointer within the same session. This enables the remote control program or operating system to receive, track, and display multiple mouse pointers. Keyboards fall into the same category. If multiple keyboards were connected, then each keyboard would have its own input stream. As shown in the example of FIG. 6, pointer 1 is specific to user 1, pointer 2 is specific to user 2, and pointer 3 is specific to user 3. In FIG. 6, users 1, 2, and 3 are identified by unique identifiers denoted as UserID1, UserID2, and UserID3, respectively.

The mouse/keyboard/input streams are transferred from the respective user's computer in node 1, node 2, . . . , or node N over the communication network 25 to the destination node which then takes the input and applies the appropriate action to the respective correlating object (see FIG. 1). For example, when user 1 moves the mouse of user 1, the data is transmitted over the communication network 25 to the destination computer. The destination computer correlates the incoming data (e.g., a stream from user 1 which is on connection 9081, from user 2 on connection 9082, etc) which is then used to move user 1's mouse pointer around the screen of user 1 which does not affect the mouse pointers of the other users.

Figure 7:
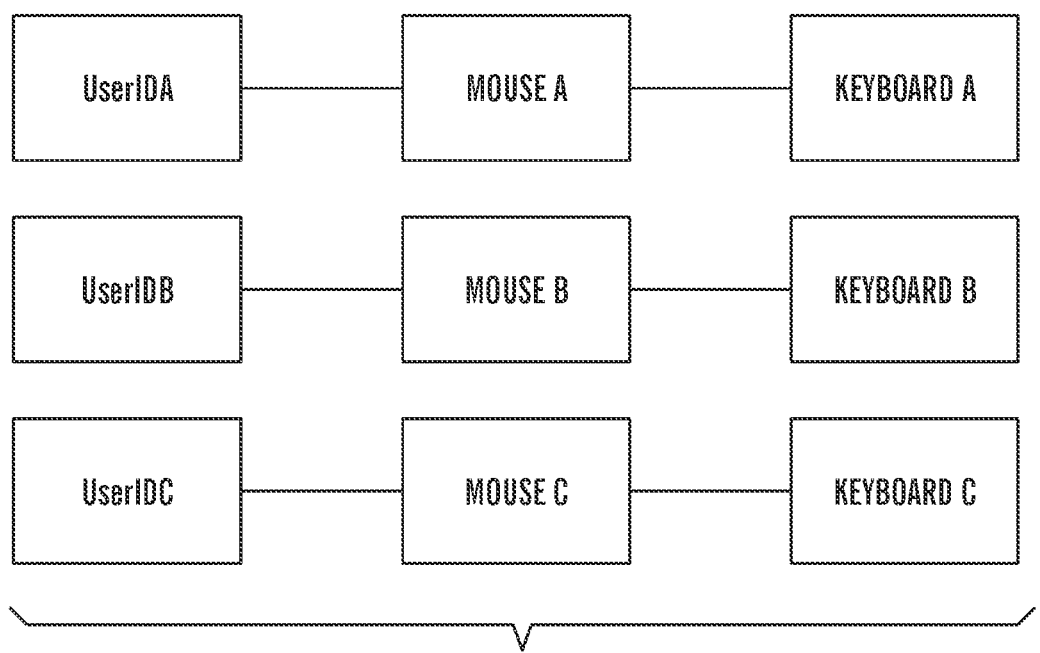
FIG. 7 describes the use of management of pointer relationships, in accordance with embodiments of the present invention.

FIG. 7 describes the use of management of pointer relationships, in accordance with embodiments of the present invention. A relationship between input devices is maintained by the remote control program or operating system. The present invention requires an explicit relationship mapping of various input devices and could be maintained by a table or database or similar device. Each input device is uniquely named and assigned a relationship to other input devices. For example, keyboard 1 would have a direct relationship to mouse 1 and keyboard 2 would have a direct relationship with mouse 2, etc. This allows multiple devices that are paired together to work together in a coherent fashion. As shown in the example of FIG. 7, user A is assigned keyboard A and mouse A, user B is assigned keyboard B and mouse B, and user C is assigned keyboard C and mouse C. Thus, when user A is working with window X having focus and user B is working with focus window Y having focus, there is no confusion as to which windows keyboards A and B should affect. User A brings window X into focus using mouse A and user B brings window Y into focus using mouse B. Because window X was brought into focus using mouse A, the remote control program or operating system is able to assign keyboard A's input to window X and separately stream keyboard B's input to window Y. Without this management function of pointer relationships, user B's keyboard input could be misappropriated to user A's window. If both users select the same window for focus, then the relationship mapping will allow both users to send keyboard input into the same window. As shown in FIG. 7, mouse A and keyboard A are specific to user A, mouse B and keyboard B are specific to user B, and mouse C and keyboard C are specific to user C. In FIG. 7, users A, B, and C are identified by unique identifiers denoted as UserIDA, UserIDB, and UserIDC, respectively.

Figure 8:
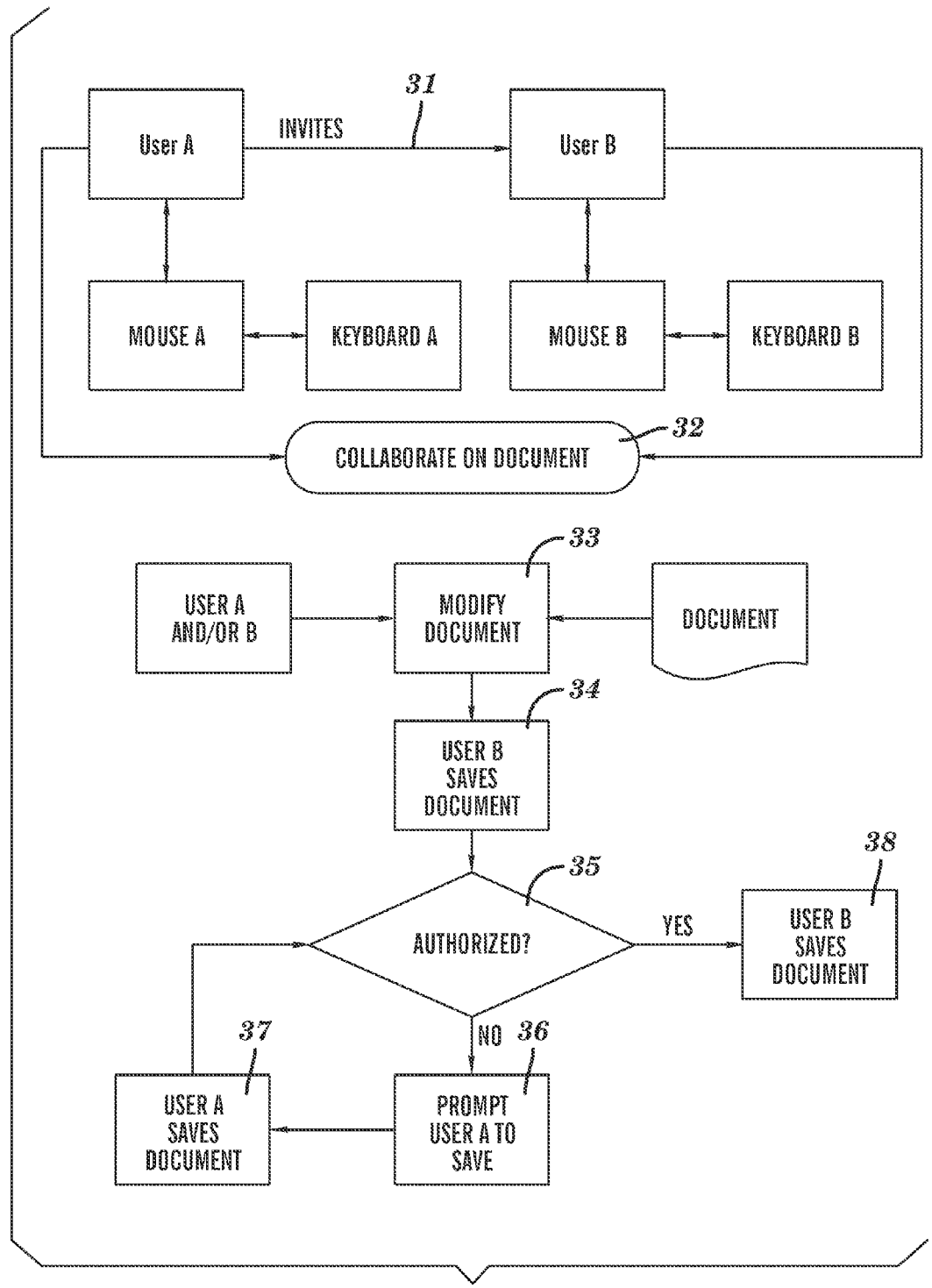
FIG. 8 describes the use of management of UserID mappings, in accordance with embodiments of the present invention.

FIG. 8 describes the use of management of UserID mappings, in accordance with embodiments of the present invention. The present invention provides assignment of UserIDs to input devices. In one embodiment for assigning UserIDs to input devices, a single UserID can be assigned to multiple input devices, or pairs of devices, as described supra in conjunction with management of pointer relationship, through use of a tracking class or thread. Authorization is applied to each input device based on a single UserID but the independent tracking of input devices is maintained in separate threads. In one embodiment for assigning UserIDs to input devices, multiple or independent UserID's can be assigned to each input device multiple input devices. This allows multiple users to maintain a security context around what the multiple users are authorized to do but to still maintain continuity within a RCS.

In FIG. 8, users A and B are identified by unique identifiers denoted as UserIDA and UserIDB, respectively.

In step 31, user A invites user B to join a RCS to collaborate on the document. User A's keyboard A and mouse A are assigned a relationship and mapped to the User ID of user A. User B's keyboard B and mouse B are assigned a relationship and mapped to the UserID of user B. At the same time some assignment is made so that input from User B coming across the communication network 25 (see FIG. 1) is readily identifiable as data from User B and not another user. This can be accomplished through mapping the connection User B has connected through over the communication network 25 to data belonging to User B's input devices. User B launches file X in a word processor. File X comprises a document. User B joins the RCS so that users A and B may collaborate on the document (step 32). User A and/or user B make several changes to the document in file X (step 33).

In the following two scenarios, all input to an application (i.e. spreadsheet, word processor, etc) from each user is appropriately identified with the respective user. This way when "track changes" features of the application are activated, the appropriate user making changes is associated with that user's changes.

In a first scenario, user A has "administrator" rights for file saving, and user B has "guest" rights for file saving. File X can be viewed by all users but written to or saved by administrators only. User A is an administrator and user B is not an administrator. In FIG. 8, user B tries to save the file in step 34, and step 35 determines that user B is not authorized by remote control program or operating system to perform a file save operation. Thus, a warning dialog appears stating that user B is not authorized to perform a file save operation and user A is prompted to save file X (step 36). Thus, user A successfully saves file X (step 37), because the actions of mouse A were validated or authorized by the remote control program or operating system.

In a second scenario, user A has "administrator" rights for file saving, and UserIDB is mapped to UserIDA with respect to user A's "administrator" rights. Thus, when the operating system detects action by users B's pointers, the remote control program or operating system will identify such action by users B's pointers with UserIDB. The remote control program or operating system will then assess whether such action by users B's pointers are authorized in view of UserIDB being mapped to UserIDA with respect to user A's "administrator" rights. In FIG. 8, user B tries to save the file in step 34 and step 35 determines that user B is authorized by operating system to perform a file save operation. Thus, user B successfully saves file X (step 38), because the remote control program or operating system has associated administrator rights with the actions of both mouse A and mouse B, due to the mapping of UserIDB to UserIDA with respect to user A's "administrator" rights in combination with the assignment of mouse B to UserIDB.

The use of multiple input devices with the present invention may comprise both local-local or local-remote combinations. In a first RCS embodiment, there is a local input pair (keyboard/mouse) and one or more remote pairs (keyboard/mouse). In a second RCS embodiment, there is multiple pairs of input devices on the same local computer (i.e., a computer that has two or more mice and two or more keyboards). In the second RCS embodiment, two users could sit side by side each with their own input devices and collaborate or share the computing session/GUI.

Figure 9:
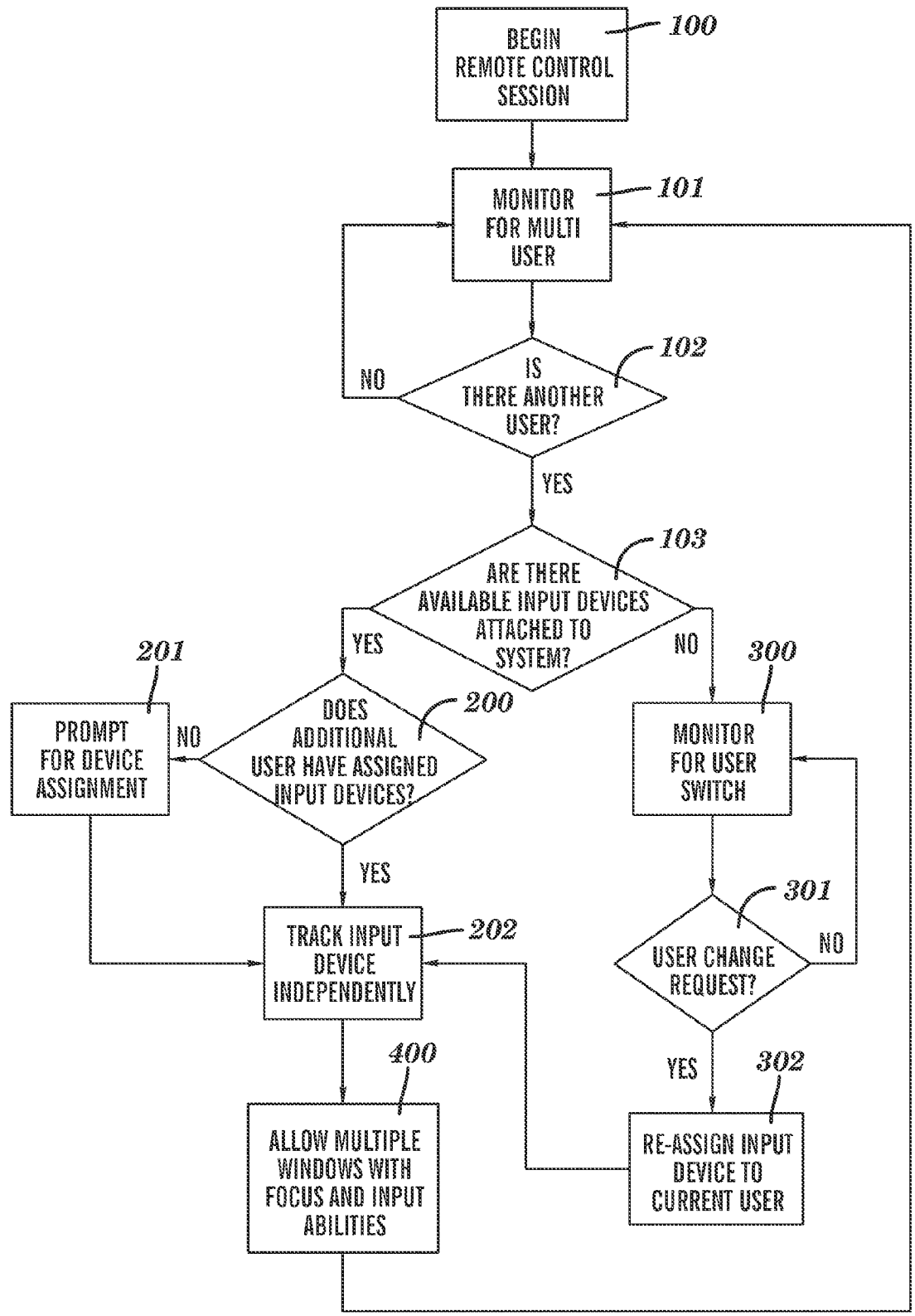
FIG. 9 is a flow chart describing a method for adding users and their input devices to a multi-focus remote control session, in accordance with embodiments of the present invention.

FIG. 9 is a flow chart describing a method for adding users and their input devices to a multi-focus remote control session, in accordance with embodiments of the present invention.

In step 100, a remote control session (RCS) begins. The program code (e.g., remote control program or operating system) processes and tracks users authenticating themselves to the program code and gaining control over the various input devices (mouse, keyboard, tablet, light pen, etc).

After a RCS is initiated in step 100, the program code monitors for additional users in step 101 and determines in step 102 whether there is another user to authenticate. If step 102 determines that there is not another user to authenticate, then the method loops back to step 101 to continue to monitor for additional users. If step 102 determines that there is another user to authenticate, then step 103 is next executed.

Step 103 determines whether there are available input devices attached to the system (i.e., attached input devices not already assigned to an existing user in the RCS). If step 103 determines that there are available input devices attached to the system, then step 200 is next executed; otherwise, step 300 is next executed.

Step 200 determines whether any of the available input devices are currently assigned to the additional user determined in step 102 to authenticate. For example, if there are two mice and two keyboards attached to the computer, then the system will check to see if the one or more sets of the attached two mice and two keyboard input devices are currently assigned to the additional user.

If step 200 determines that any of the any of the available input devices are currently assigned to the additional user, then step 202 is next executed; otherwise step 201 then makes input device assignments of one or more of the available input devices with respect to the additional user, followed by execution of step 202.

Step 202 records and tracks the assigned input devices of the additional user independent of the input devices of other existing users of the RCS. The assigned input devices, pointer relationships, and UserID mappings of the users in the RCS may be recorded in one or more tables of the database 22 (see FIG. 1), such as Tables 1 and 2 infra.

TABLE 1

| UserID | Input Device 1 | Input Device 2 |
|---|---|---|
| Greg Boss | Thinkpad Ultranav on USB002 | Standard 101/102 Keyboard on USB001 |
| Kulvir Bogal | Microsoft Trackball on USB003 | Logitech Keyboard on USB004 |
| Alex Polozoff | Logitech Mouse over connection 9083 | Logitech Keyboard over connection 9083 |

TABLE 2

| UserID | Mapped To |
|---|---|
| Greg Boss Kulvir Bogal Alex Polozoff | Greg Boss |

Greg Boss has "administrator" rights for file saving, and Kulvir Bogal is mapped to Greg Boss with respect to the "administrator" rights of Greg Boss.

After step 202 is executed, each active user 400 can obtain access to one window having focus independently of other users within the RCS.

Step 400 (described infra in detail in conjunction with FIG. 10) performs control of multi-focus windows in the RCS such that each active user can obtain access to one window having focus independent of windows having focus or to a window having focus that at least one other has access to, followed by looping back to step 101 to monitor for more users entering the RCS.

Step 300 monitors for a current user of the RCS having control over a currently attached input device to initiate a transfer of said control over to the additional user that is waiting for said transfer of control of the attached input device from the current user. Thus, step 301 determines whether said transfer of control of a currently attached input device from a current user has been initiated.

If step 301 determines that said transfer of control of a currently attached input device from a current user has not been initiated, then the method loops back to step 300 to continue to monitor for said initiation of transfer of control of a currently attached input device from a current user; otherwise step 302 is next executed.

Step 302 re-assigns the currently attached input device from the current user to the additional user, followed by transferring program control to step 202 to track the re-assigned input device of the additional user independent of the input devices of other existing users of the RCS, followed by control of multi-focus windows in step 400 and subsequent looping back to step 101 to monitor for more users entering the RCS.

Figure 10:
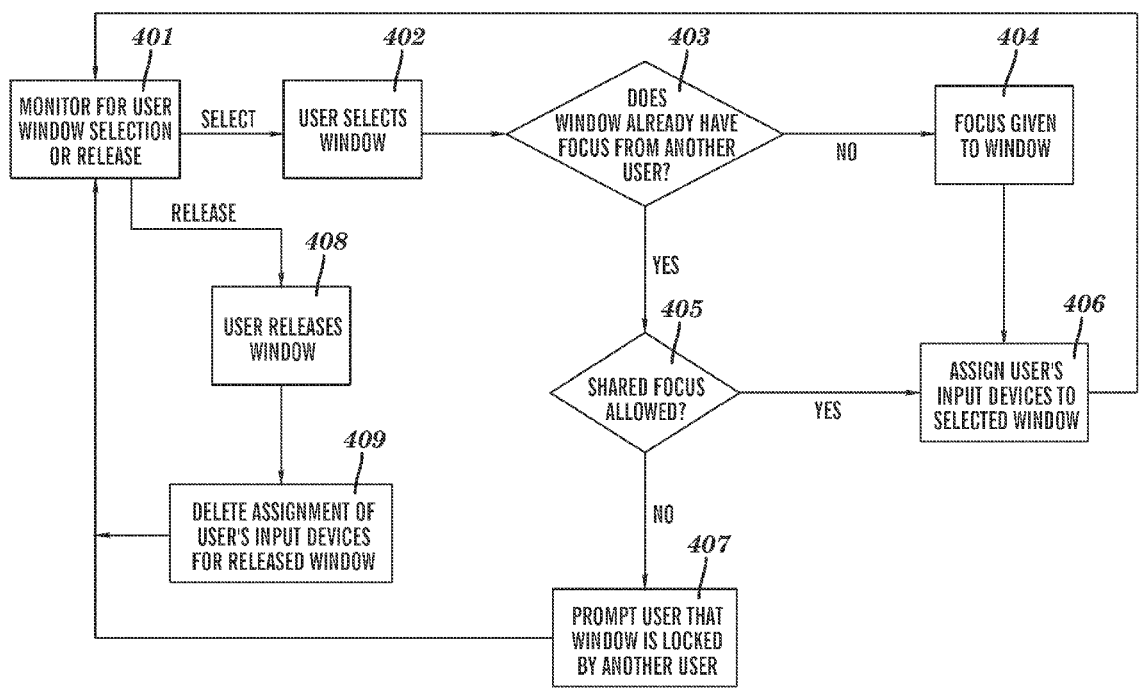
FIG. 10 is a flow chart describing a method for controlling multi-focus windows in a remote control session, in accordance with embodiments of the present invention.

FIG. 10 is a flow chart describing implementation of step 400 of FIG. 9 for controlling multi-focus windows in a remote control session, in accordance with embodiments of the present invention.

Step 401 monitors selection or release of a window by a user of any of the multiple users in the RCS and determines in step 401 whether one of the multiple users has selected or released a window. If the user has selected a window, as indicated in step 402, then step 403 is executed after step 402. If the user has released a window, as indicated in step 408, then step 409 is executed after step 408.

Step 403 determines whether the selected window already has focus from another user.

If step 403 determines that the selected window does not have focus from another user, then step 404 provides focus to the window-selecting user and step 406 subsequently assigns input devices of the window-selecting user to the selected window so that the window-selecting user's input device streams will affect the selected window which has focus, followed by looping back to step 401 to monitor for selection or release of a window by a user in the RCS.

If step 403 determines that the selected window already has focus from another user, then step 405 determines if shared focus in a window is allowed in the RCS. Shared focus in a window means that at least two users have concurrent (i.e., simultaneous) access to the window. Allowance or non-allowance of shared focus in a window may be set by an administrator or may alternatively be a default setting at the time of installation of the remote control program or operating system.

If step 405 determines that shared focus in a window is allowed, then program control is transferred to step 406 which has been described supra.

If step 405 determines that shared focus in a window is not allowed, then step 407 displays a prompt to the window-selecting user, indicating that the selected window cannot be given focus because the selected window already has focus from another user, followed by looping back to step 401 to monitor for selection or release of a window by a user in the RCS.

Step 409 deletes the user's input devices that had been previously assigned to the released window, followed by looping back to step 401 to monitor for selection or release of a window by a user in the RCS.

Figure 11:
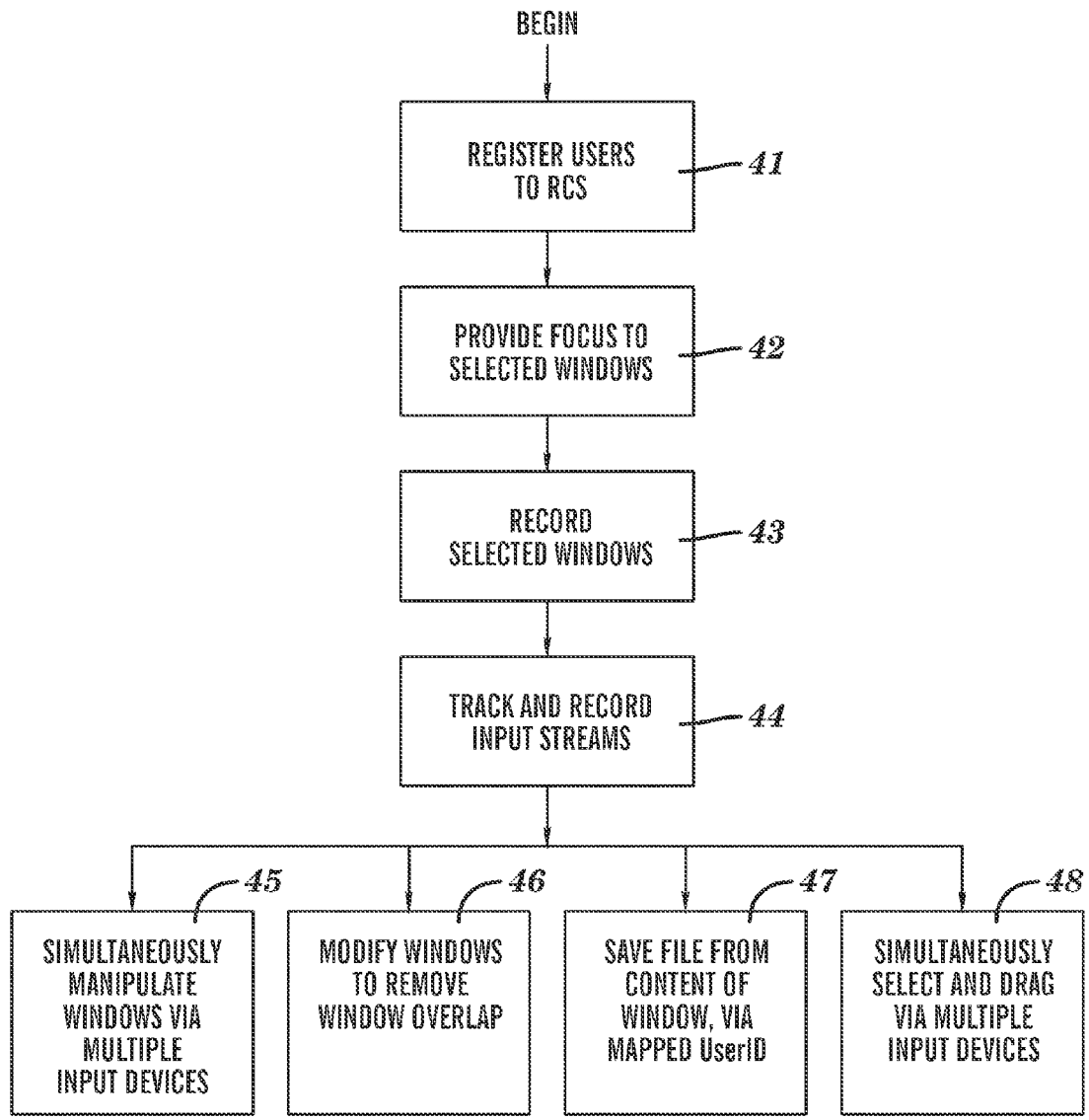
FIG. 11 is a flow chart describing a method for managing a multi-focus remote control session (RCS) within a computer system, in accordance with embodiments of the present invention.

FIG. 11 is a flow chart describing a method for managing a multi-focus remote control session (RCS) within a computer system, in accordance with embodiments of the present invention. The flow chart of FIG. 11 comprises steps 41-48, which are performed by program code 21 while executing on a processor of the computer system 20 that is coupled to the communication network 25 (see FIG. 1).

Step 41 registers to the RCS a UserID of each user of a plurality of users and at least one input device associated with the UserID of each user. Each user of the plurality of users is coupled to the RCS via communication network 25. The UserID of each user is a unique identifier of each user within the RCS. The at least one input device associated with the UserID of each user is attached to the computer system 20. The registering of step 41 results in the plurality of users having shared concurrent control of a computer screen of the computer system 20 via the at least one input device associated with the UserID of each user.

Responsive to selection of a window within the computer screen by an input device of the at least one input device associated with the UserID of each user after each user has been registered to the RCS in step 41, step 42 provides focus to each selected window. The focus provided to the selected windows enables concurrent operations to be performed on and within the selected windows. The focus provided to each window is specific to the UserID associated with the input device that selected the window. Each selected window having focus is configured to be accessed and manipulated by only the at least one input device associated with the UserID to which the focus provided to each selected window is specific.

Step 43 records, in a computer readable medium of the computer system 20 (e.g., in database 22), the selected windows to which focus has been provided. Each selected window is recorded in association with the UserID to which the focus provided to each selected window is specific, as illustrated infra in Tables 3-5 which reflect FIGS. 3-5, respectively.

TABLE 3

| Window | UserID |
|---|---|
| 1 | Greg Boss |
| 2 | Kulvir Bogal |
| 3 | Alex Polozoff |

TABLE 4

| Window | UserID |
|---|---|
| 1 | Greg Boss; Kulvir Bogal; Alex Polozoff |

TABLE 5

| Window | UserID |
|---|---|
| 1 | Greg Boss; Kulvir Bogal |
| 2 | Alex Polozoff |

Step 44 tracks and records (in a storage device or medium of the computer system 20 such as in the database 22) input streams from the at least one input device associated with the UserID of each user, as illustrated infra in Table 6.

TABLE 6

| Input Device | Input Stream |
|---|---|
| 1 | Input stream 1 (i.e., sequential inputs from input device 1) |
| 2 | Input stream 2 (i.e., sequential inputs from input device 2) |
| 3 | Input stream 3 (i.e., sequential inputs from input device 3) |
| 4 | Input stream 4 (i.e., sequential inputs from input device 4) |

In one embodiment, the plurality of users may include a first user and a second user, wherein the focus provided to a first window of the selected windows is specific to the UserID of the first user, and wherein the focus provided to a second window of the selected windows is specific to the UserID of the second user, such as in Table 3 supra. For example, the first and second input device may be a first and second mouse, respectively.

Accordingly, step 44 tracks and records a first input stream generated by a first input device of the at least one input device associated with the UserID of the first user (see Table 6) with respect to manipulation of content within the first window by the first input device during a first interval of time. Similarly, step 44 tracks and records a second input stream generated by a second input device of the at least one input device associated with the UserID of the second user (see Table 6) with respect to manipulation of content within the second window by the second input device during a second interval of time. In one embodiment, the first and second input device may be a first and second mouse, respectively.

The first input stream and the second input stream may comprise simultaneous manipulation of content within the first window and the second window by the first input device and the second input device during the first interval of time and the second interval of time, respectively.

In one embodiment, the first window and the second window are different windows.

In one embodiment, the first window does not overlap the second window, and the second window does not overlap the first window.

Figure 12:
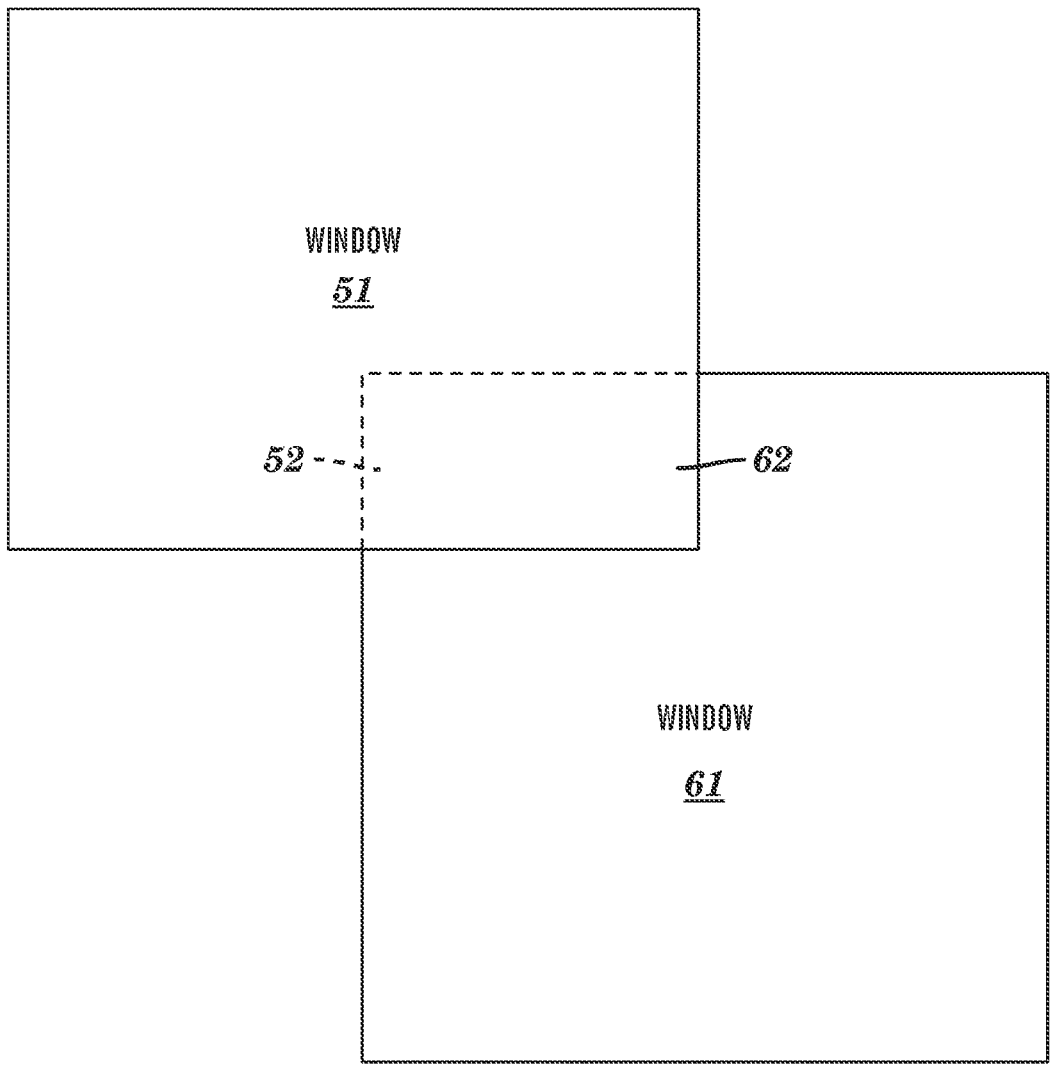
FIG. 12 depicts two windows which overlap, in accordance with embodiments of the present invention.

In one embodiment illustrated in FIG. 12, the first window 51 and the second window 61 are in a first configuration in which a first portion 52 of the first window 51 overlaps a second portion 62 of the second window 61.

The tracking and recording of input streams in step 44 may apply to any of the embodiments of steps 45-48, discussed infra.

In step 45, the simultaneous manipulation comprises simultaneous manipulation of content within the first portion of the first window and the second portion of the second window by the first input device and the second input device during the first interval of time and the second interval of time, respectively.

In step 45 with respect to FIG. 12, the simultaneous manipulation of content within the first window and the second window in step 44 may comprise simultaneous manipulation of content within the first portion 52 of the first window 51 and the second portion 62 of the second window 61 by the first input device and the second input device during the first interval of time and the second interval of time, respectively.

In one embodiment, step 46 modifies the first and second windows to remove the window overlap depicted in FIG. 12. A user input device is selected from the group consisting of the first input device and the second input device. The selected input device is authorized to move and/or resize at least one window to change a configuration of the first window and the second window from the first configuration of FIG. 12 to a second configuration in which the first and second windows do not overlap. The at least one window that is moved and/or resized is selected from the group consisting of the first window, the second window, and both the first window and the second window. As a result of step 46 for an illustrative case of three overlapping windows, the second configuration of non-overlapping windows is illustrated in FIG. 2 in which the windows 31, 32, and 33 do not overlap.

In one embodiment, the user input device used to remove the window overlap is chosen to be: the first input device if the first user was registered to the RCS before the second user was registered to the RCS; or the second input device if the second user was registered to the RCS before the first user was registered to the RCS. Registering the first and second user to the RCS is performed in step 41, discussed supra.

In one embodiment in which the first user has a first user priority and the second user has a second user priority that differs from the first user priority, the user input device used to remove the window overlap is chosen to be: the first input device if the first user priority is higher than the second user priority; or the second input device if the second user priority is higher than the first user priority.

In one embodiment in which the first window comprises a first application having a first application priority and the second window comprises a second application having a second application priority that differs from the first application priority, the user input device used to remove the window overlap is chosen to be: the first input device if the first application priority is higher than the second application priority; or the second input device if the second application priority is higher than the first application priority.

In one embodiment, the first window and the second window are a same window.

In step 47 with respect to the first and second window being the same window, the first user has administrator rights to save content within the first window via an association of the administrator rights with the UserID of the first user. The UserID of the second user is mapped to the UserID of the first user. The second input stream comprises an action by the second input device to save a file derived from content within the same window. Tracking of the second input stream comprises detecting the action in the second input stream to save the file. It is ascertained that the action to close the file by the second input device is authorized, based on the mapping of the UserID of the second user to the UserID of the first user in conjunction with the administrator rights associated with the UserID of the first user. After said ascertaining that the action to close the file is authorized, the file is saved.

Figure 13:
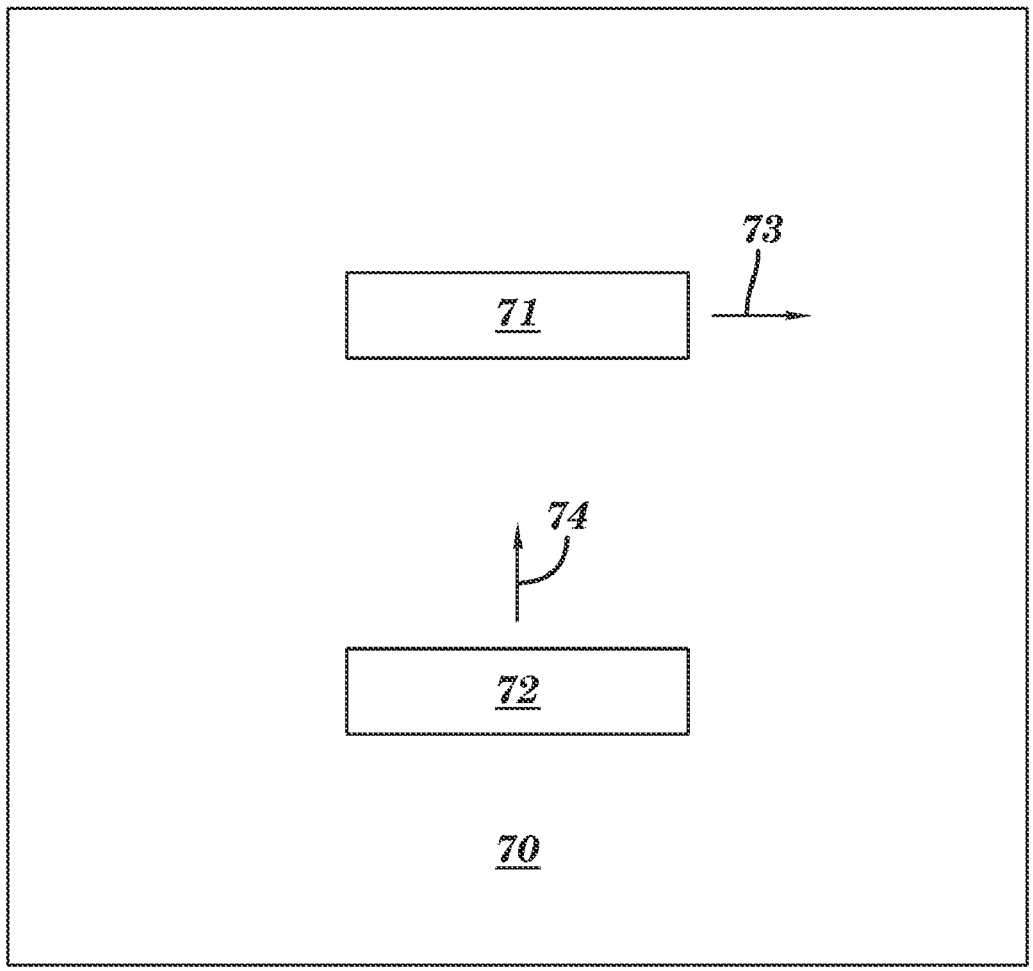
FIG. 13 depicts simultaneous selecting and dragging of different content in a same window through use of respective input devices, in accordance with embodiments of the present invention.

In step 48 with respect to the first and second window being the same window as illustrated in FIG. 13 in accordance with embodiments of the present invention, the simultaneous manipulation of content within the same window 70 in step 48 may comprise a selection of first content 71 in the same window 70 by the first input device that is simultaneous with a selection of second content 72 in the same window 70 by the second input device. In one embodiment, the simultaneous manipulation of content within the same window 70 may further comprises dragging the selected first content 71 in the direction 73 that is simultaneous with dragging the selected second content 72 in the direction 74.

Figure 14:
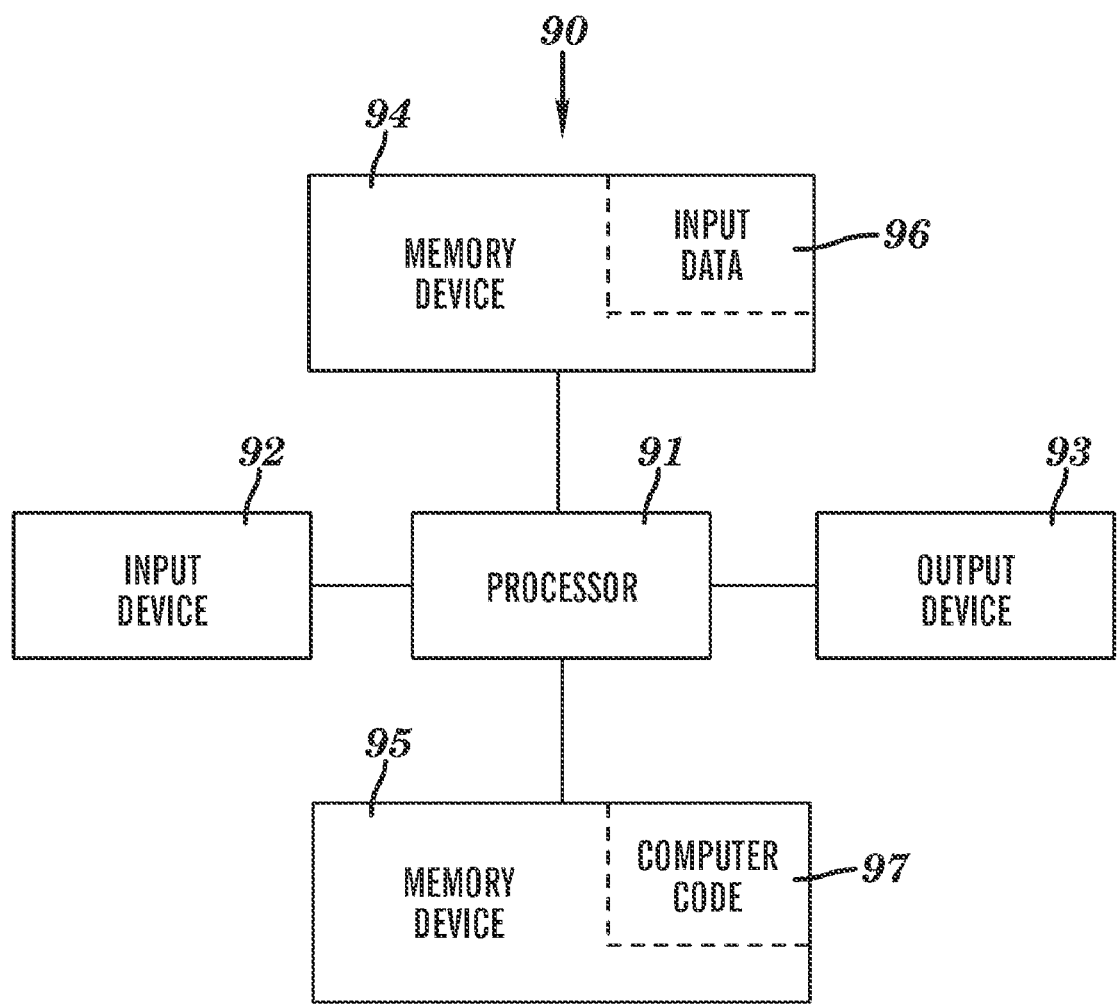
FIG. 14 illustrates a computer system used for managing a multi-focus remote control session, in accordance with embodiments of the present invention.

FIG. 14 illustrates a computer system 90 used for managing a multi-focus remote control session (RCS), in accordance with embodiments of the present invention. The computer system 90, which may be used for the computer system 20 of FIG. 1, comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for managing a multi-focus remote control session (RCS). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 1) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

The present invention discloses a process for deploying or integrating computing infrastructure, comprising integrating computer-readable code into the computer system 90, wherein the code in combination with the computer system 90 is capable of performing a method for managing a multi-focus remote control session (RCS). Any of the components of the present invention could be deployed, managed, serviced, etc. by a service provider.

In another embodiment, the invention provides a business method that performs the process steps of the invention on a subscription, advertising, and/or fee basis. That is, a service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing a multi-focus remote control session (RCS) within a computer system, said method comprising:

registering to the RCS a UserID of each user of a plurality of users and at least one input device associated with the UserID of each user, wherein each user of the plurality of users is coupled to the RCS via a communication network, wherein the UserID of each user is a unique identifier of each user within the RCS, wherein the at least one input device associated with the UserID of each user is attached to the computer system, and wherein said registering results in the plurality of users having shared concurrent control of a computer screen of the computer system via the at least one input device associated with the UserID of each user;

responsive to selection of a window within the computer screen by an input device of the at least one input device associated with the UserID of each user after each user has been registered to the RCS, providing focus to each selected window, wherein the focus provided to the selected windows are concurrently operative, wherein the focus provided to each window is specific to the UserID associated with the input device that selected the window, and wherein each selected window having focus is configured to be accessed and manipulated by only the at least one input device associated with the UserID to which the focus provided to each selected window is specific; and recording, in a computer readable medium of the computer system, the selected windows to which focus has been provided, wherein each selected window is recorded in association with the UserID to which the focus provided to each selected window is specific, wherein said registering, said providing focus, and said recording the selected windows are performed by program code while executing on a processor of a computer system that is coupled to the communication network.

2. The method of claim 1, wherein the plurality of users include a first user and a second user, wherein the focus provided to a first window of the selected windows is specific to the UserID of the first user, wherein the focus provided to a second window of the selected windows is specific to the UserID of the second user, and wherein the method further comprises:

tracking and recording a first input stream generated by a first input device of the at least one input device associated with the UserID of the first user with respect to manipulation of content within the first window by the first input device during a first interval of time; and tracking and recording a second input stream generated by a second input device of the at least one input device associated with the UserID of the second user with respect to manipulation of content within the second window by the second input device during a second interval of time, wherein the first input stream and the second input stream comprise simultaneous manipulation of content within the first window and the second window by the first input device and the second input device during the first interval of time and the second interval of time, respectively.

3. The method of claim 2, wherein the first window and the second window are different windows.

4. The method of claim 3, wherein the first window does not overlap the second window, and wherein the second window does not overlap the first window.

5. The method of claim 3, wherein the first window and the second window are in a first configuration in which a first portion of the first window overlaps a second portion of the second window.

6. The method of claim 5, wherein the method further comprises:

choosing a user input device selected from the group consisting of the first input device and the second input device;

authorizing the user input device to move and/or resize at least one window to change a configuration of the first window and the second window from the first configuration to a second configuration in which the first and second windows do not overlap, and wherein the at least one window is selected from the group consisting of the first window, the second window, and both the first window and the second window.

7. The method of claim 6, wherein said choosing comprises:

choosing the first input device if the first user was registered to the RCS before the second user was registered to the RCS; or choosing the second input device if the second user was registered to the RCS before the first user was registered to the RCS.

8. The method of claim 6, wherein the first user has a first user priority, wherein the second user has a second user priority that differs from the first user priority, and wherein said choosing comprises:

choosing the first input device if the first user priority is higher than the second user priority; or choosing the second input device if the second user priority is higher than the first user priority.

9. The method of claim 6, wherein the first window comprises a first application having a first application priority, wherein the second window comprises a second application having a second application priority that differs from the first application priority, and wherein said choosing comprises:

choosing the first input device if the first application priority is higher than the second application priority; or choosing the second input device if the second application priority is higher than the first application priority.

10. The method of claim 5, wherein the simultaneous manipulation comprises simultaneous manipulation of content within the first portion of the first window and the second portion of the second window by the first input device and the second input device during the first interval of time and the second interval of time, respectively.

11. The method of claim 10, wherein the first input device is a first mouse, and wherein the second input device is a second mouse.

12. The method of claim 2, wherein the first window and the second window are a same window.

13. The method of claim 12, wherein the first input device is a first mouse, and wherein the second input device is a second mouse.

14. The method of claim 12, wherein the first user has administrator rights to save content within the first window via an association of the administrator rights with the UserID of the first user, wherein the UserID of the second user is mapped to the UserID of the first user, and wherein the second input stream comprises an action by the second input device to save a file derived from content within the same window, and wherein said tracking the second input stream comprises detecting the action in the second input stream to save the file, and wherein the method further comprises:

ascertaining that the action to close the file is authorized, said ascertaining based the mapping of the UserID of the second user to the UserID of the first user in conjunction with the administrator rights associated with the UserID of the first user; and after said ascertaining, saving the file.

15. The method of claim 12, wherein the simultaneous manipulation comprises a selection of first content in the same window by the first input device that is simultaneous with a selection of second content in the same window by the second input device.

16. The method of claim 15, wherein the simultaneous manipulation further comprises a dragging in the same window of the selected first content that is simultaneous with a dragging in the same window of the selected second content.

17. The method of claim 15, wherein an operating system of the computer system comprises the program code.

18. A computer program product, comprising a computer readable medium having a computer readable program code stored therein, said computer readable program code containing instructions that implement the method of claim 1 when executed by the processor of the computer system.

19. A computing system, comprising a computer readable memory unit containing instructions that implement the method of claim 1 when the instructions are executed by the processor of the computer system, wherein the computing system comprises the computer system, and wherein the computer system comprises the computer readable memory unit.

20. A process for integrating computing infrastructure, said process comprising integrating computer-readable code into a computing system, wherein the computer-readable code in combination with the computing system is configured to perform the method of claim 1, wherein the computing system comprises the computer system, and wherein the computer-readable code comprises the program code.

* * * * *